US006786651B2

(12) United States Patent
Raj et al.

(10) Patent No.: US 6,786,651 B2
(45) Date of Patent: Sep. 7, 2004

(54) OPTICAL INTERCONNECT STRUCTURE, SYSTEM AND TRANSCEIVER INCLUDING THE STRUCTURE, AND METHOD OF FORMING THE SAME

(75) Inventors: Kannan Raj, Chandler, AZ (US); Wuchun Chou, Chandler, AZ (US); C. Phillip McClay, Fountain Hills, AZ (US); Robert Carroll, Andover, MA (US); Suresh Golwalkar, Phoenix, AZ (US); Noah Davis, Los Angeles, CA (US); John Burns, Harbor City, CA (US)

(73) Assignee: Primarion, Inc., Tempe, AZ (US)

( * ) Notice: Subject to any disclaimer, the term of this patent is extended or adjusted under 35 U.S.C. 154(b) by 0 days.

(21) Appl. No.: 10/104,942

(22) Filed: Mar. 22, 2002

(65) Prior Publication Data

US 2002/0175339 A1 Nov. 28, 2002

Related U.S. Application Data

(60) Provisional application No. 60/277,838, filed on Mar. 22, 2001, provisional application No. 60/277,924, filed on Mar. 22, 2001, and provisional application No. 60/286,888, filed on Apr. 27, 2001.

(51) Int. Cl.[7] .................................................. G02B 6/36
(52) U.S. Cl. ........................................... 385/88; 385/49
(58) Field of Search ..................................... 385/49, 88

(56) References Cited

U.S. PATENT DOCUMENTS 4,153,330 A * 5/1979 Tomlinson, III ............. 385/35
5,241,614 A 8/1993 Ecker et al.
5,384,873 A * 1/1995 Chun et al. ................... 385/31
5,400,419 A 3/1995 Heinen
5,432,338 A 7/1995 Bossler
5,671,315 A 9/1997 Tabuchi et al.
5,854,867 A * 12/1998 Lee et al. ..................... 385/49
5,987,202 A * 11/1999 Gruenwald et al. ........... 385/49
6,243,508 B1 * 6/2001 Jewell et al. ................. 385/14
6,517,259 B1 * 2/2003 Murata ........................ 385/92
6,567,590 B1 * 5/2003 Okada et al. ................. 385/49
6,666,590 B2 * 12/2003 Brosnan ...................... 385/93

FOREIGN PATENT DOCUMENTS

DE 35 43 558 A 6/1987
EP 0 395 854 A 11/1990

OTHER PUBLICATIONS

PCT International Search Report; PCT/US02/08460; Feb. 7, 2003; 4 pp.

* cited by examiner

*Primary Examiner*—Douglas Wille
(74) *Attorney, Agent, or Firm*—Theodore E. Galanthay

(57) ABSTRACT

A system for coupling optoelectronic devices, associated electrical components, and optical fibers is described. The system includes a substrate to which optoelectronic devices and at least some of the associated electronic components are formed on or formed using the substrate material. The substrate is further configured to receive and attach to one or more optical fibers. The system can be used to form transceivers for multiplexing and/or demultiplexing electronic information.

7 Claims, 7 Drawing Sheets

108
112
104
h
Δ
106

OPTICAL INTERCONNECT STRUCTURE, SYSTEM AND TRANSCEIVER INCLUDING THE STRUCTURE, AND METHOD OF FORMING THE SAME

CROSS REFERENCE TO RELATED APPLICATIONS

This Application claims priority to Provisional Application Serial No. 60/277,838, entitled "High Speed Optical Transceiver Array on Compact Chip Carrier with Integrated Fibers on V-Grooves", filed Mar. 22, 2001; to Provisional Application Serial No.60/277,924, entitled "Integrated 90 Degree Turn Coupler on Chip Carrier for High Speed Optical Links", filed Mar. 22, 2001; to Provisional Application Serial No. 60/286,888, entitled "High Speed Integrated Optical Transceiver Array Module", filed Apr. 27, 2001; and to application Ser. No. 10/055,679, entitled "Optical Interconnect with Integral Reflective Surface and Lens, System Including the Interconnect and Method of Forming the Same", filed Jan. 22, 2002.

FIELD OF THE INVENTION

The present invention generally relates to optical interconnects and systems including optical interconnects. More particularly, the invention relates to apparatus for coupling light emitting and/or light detecting devices and associated electronic components to an optical fiber, modules including the apparatus and components, and to methods of making the apparatus and module.

BACKGROUND OF THE INVENTION

Systems including optical interconnect devices are often used to transmit information at high data rates. For example, such systems are used for board-to-board, backplane, local area network (LAN), wide area network (WAN) and similar applications. Optical systems are advantageous compared to electrical interconnect systems because optical systems are generally less susceptible to electromagnetic interference, which often results in cross-talk within the system and external noise emission from the system, particularly as the rate of information transfer increases. However, optical interconnect systems are typically relatively expensive compared to electrical interconnect systems, and thus factors such as distance the transmitted signal must travel, bandwidth required by the system, cost, power consumption, signal integrity requirements, and the like are often considered before selecting a type of system.

Typical optical interconnect systems generally include an optoelectronic device such as a light emitting (e.g., laser) and/or a light detecting (e.g., a photodiode) device, an electronic device (e.g., an amplifier and/or a driver) coupled to the optoelectronic device, and waveguide material such as a fiber ribbon cable. The optoelectronic devices are often fabricated such that the active region i.e., the area that emits or receives photons from the waveguide, is on the same surface as electrical connections for coupling the optoelectronic device to the corresponding electrical device. In this case, either the electrical connections or the optical connections must typically undergo an effective ninety-degree bend to allow electrical coupling between the optoelectronic device and electronic device and optical coupling between the optoelectronic device and the waveguide. Prior-art methods and apparatus for accounting for this effective ninety-degree bend are generally expensive to manufacture and/or are relatively inefficient at transferring light between the optoelectronic device and the waveguide Accordingly, improved methods and apparatus for coupling the optoelectronic device, the electronic device, and the fiber are desired.

In addition, prior art systems often include separate substrates for the optoelectronic device and electronic components (e.g., an amplifier and/or driver) associated with the optoelectronic device. Use of separate substrates may undesirably add to the cost and complexity of manufacturing the systems. Accordingly, improved methods and apparatus for forming optical interconnects systems including a reduced number of substrates are desired.

SUMMARY OF THE INVENTION

The present invention provides an apparatus for coupling an optoelectronic device and an electronic component to an optical transmission medium or waveguide such as an optical fiber and a method of forming the apparatus. More particularly, the invention provides a method and apparatus for an optical interconnect system which requires a reduced number of substrates to couple the electronic component, the optoelectronic device, and the waveguide.

The way in which the present invention addresses various drawbacks of the now known optical interconnect devices and systems is discussed in greater detail below. However, in general, the improved optical interconnect device and system in accordance with the present invention are relatively inexpensive and easy to manufacture.

In accordance with one embodiment of the present invention, an optoelectronic device and an associated electronic device are formed on the same substrate. In accordance with one aspect of this embodiment, the substrate includes guides configured to receive fibers of a fiber optic cable and to align the fibers with input or output regions of the optoelectronic device. In accordance with a further aspect of this embodiment, the substrate includes a diver, a light-emitting device coupled to the driver, an amplifier, and a light-detecting device coupled to the amplifier. In accordance with yet a further aspect of this embodiment of the invention, a system includes a lens interposed between an optical fiber and the optoelectronic device to increase transmission efficiency of light transferred between the optoelectronic device and the fiber.

In accordance with another embodiment of the invention, a system includes an optoelectronic device and an associated electronic device formed on a first surface of a substrate and receives a transmission medium such as an optical fiber on a second surface of the substrate. In accordance with one aspect of this invention, apertures are formed through the substrate to allow light transmission between the optoelectronic device and the optical fiber.

In accordance with yet another embodiment of the invention, an interconnect system includes at least one optoelectronic device coupled to an associated electronic device, where both are formed on a single substrate and where the optoelectronic device is configured to receive or emit light in a direction away from the surface of the substrate. In accordance with one aspect of this embodiment, the optoelectronic device and the associated electronic device are coupled using wire bonds.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

The present invention generally relates to optoelectronic assembly devices and structures. More particularly, the invention relates to structures and assemblies including an optoelectronic device and an associated electronic device formed or coupled to a substrate and to systems including the assembly and a transmission path such as an optical fiber.

Figure 1:
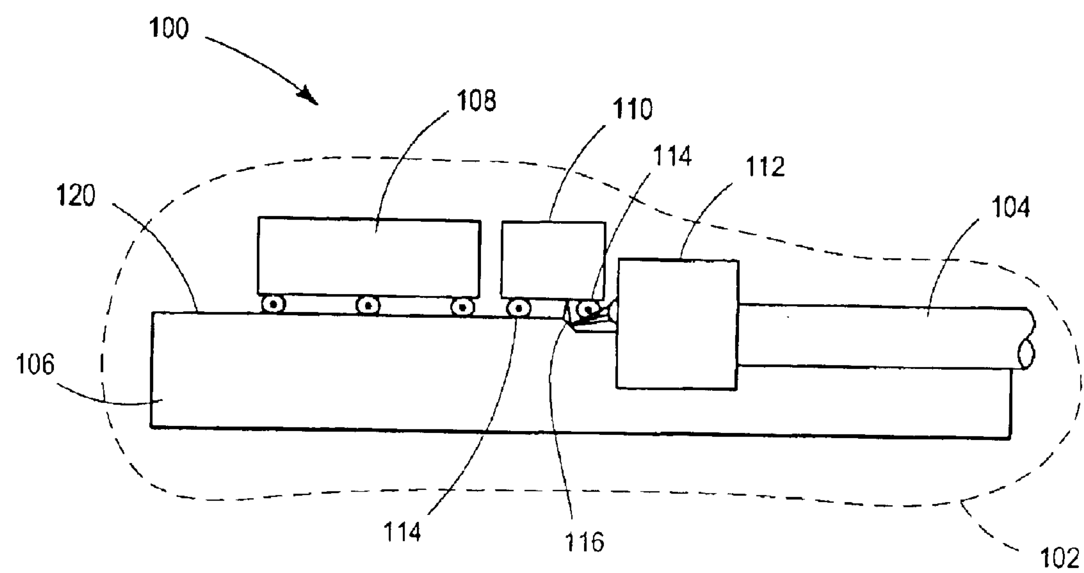
FIG. 1 is a schematic illustration of a portion of an optical interconnect system in accordance with the present invention.

FIG. 1 schematically illustrates a system 100, including an assembly 102 coupled to an optical fiber 104, in accordance with one embodiment of the present invention. Assembly 102 includes a substrate 106, an electronic device 108 formed on or coupled to substrate 106, an optoelectronic device 110 formed on or coupled to substrate 106, and optionally includes a lens or lens array 112, as discussed in more detail below.

In operation, light is transmitted between device 110 and fiber 104 using a portion of substrate 106 to reflect the transmitted light. As noted above, reflecting of the light is often desirable because optoelectronic devices often receive or emit light through and in a direction away from the same surface on which electrical connections (e.g., conductive bumps 114) are formed, which direction is often perpendicular to a surface on which fiber 104 receives or emits light. Although optical interconnect systems that include optoelectronic devices that emit or receive light in a direction that is perpendicular to the receiving or emitting surface of fiber 104 requires reflecting or bending of light to increase optical efficiency of the system, such systems are often desirable because they allow relatively short electrical connections (e.g., bump 114) between device 110 and substrate 106 and between device 110 and other electronic devices such device 108. In addition, surface emitting detectors and emitters may be manufactured and attached to substrate 106 in one-dimensional or two-dimensional arrays, are relatively inexpensive to manufacture.

Fiber 104 of system 100 may include any medium suitable for transferring light emitted from or received by device 106. In accordance with one embodiment of the invention, fiber 108 is an optical fiber from an MT series type fiber optic coupler, having a core diameter of about 50 $\mu$m. In accordance with other embodiments of the invention, system 100 may further include waveguides interposed between device 110 and fiber 104. Such waveguides may be formed of silicon oxide or other transparent material.

Substrate 106 may be formed of any suitable material, such as ceramic, plastic, optical substrate material, e.g., borosilicate, or semiconductor material, including compound and mixed semiconductor substrates. In accordance with one exemplary embodiment of the invention, substrate 106 comprises material that supports fifty-ohm, low-loss coplanar microwave transmission lines suitable for ten gigabits per second and higher transmission rates. In accordance with a further exemplary embodiment of the invention, substrate 106 includes silicon semiconductor material as is often used in semiconductor device manufacturing and further includes various electrical interconnects to couple an optoelectronic device to another microelectronic circuit such as a driver or an amplifier (e.g., to couple device 110 to device 108) and various insulating and/or passivation layers.

Figure 2:
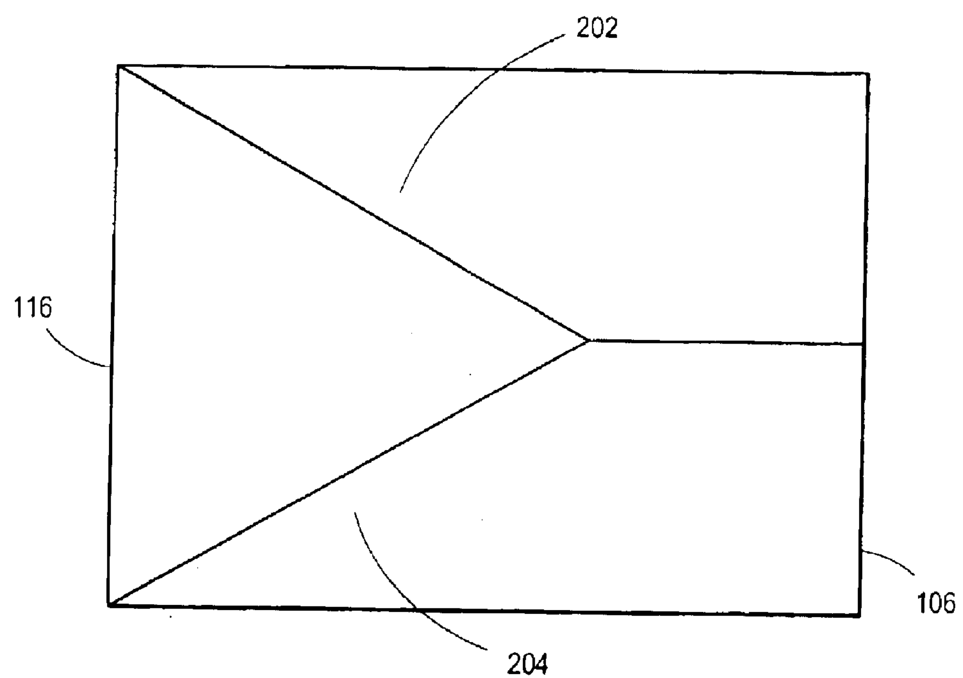
FIG. 2 is a top view of a reflecting surface and a groove formed within a portion of an optical interconnect system of the present invention.
Figure 3:
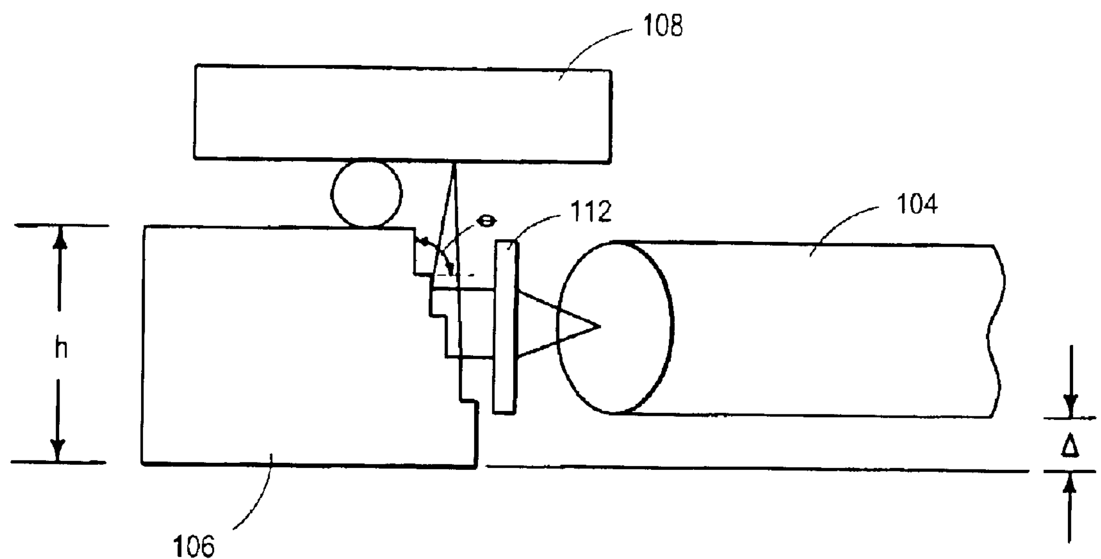
FIG. 3 is a schematic illustration of a portion of an optical interconnect system, including a grated reflective surface, in accordance with the present invention.

In accordance with various aspects of this embodiment of the invention, substrate 106 includes a reflecting surface 116 to facilitate transmission of light between optoelectronic device 110 and fiber 104. The reflecting surface may be formed in a variety of ways, such as by machining substrate 106 or etching (wet or dry) the substrate. In accordance with one exemplary aspect of the invention, surface 116 is formed using an anisotropic wet etch process to form a faceted, reflective surface, wherein the surface is between about 0 and about 90 and preferably about 40 to about 60 degrees with respect to a surface 120 of substrate 106, as illustrated in FIG. 2. Additionally, surface 116 may include a blazed grating, as illustrate in FIG. 3, wherein the angle θ is about 60 to about 120 degrees and preferably about 90 degrees and the pitch of the grating is about one micron. In this case, the blaze angle and the diffraction angle may be selected to maximize light transfer between device 110 and fiber 104. Surface 116 may further include reflective material such as gold, silver, platinum, or the like, which is coated onto surface 116.

By way of illustrative example, surfaces 116, 202, and 204, illustrated in FIG. 2, are formed using a wet etch process which preferentially etches (110) planes relative to (111) planes in silicon or similar substrates to form faceted surface angles at about 54.7 degrees from the surface. Other etches can also suitably be used to, for example, form an angled surface at about 45 degrees from the surface. When surface 116 forms an angle other than about 45 degrees with respect to the center of the fiber, lens 112 may be suitably angled such as to focus most of the transmitted light onto the axis of fiber 104 or onto a center portion of a light receiving device 110.

As explained in more detail below, surfaces 202 and 204 serve to retain a portion of an optical fiber 104 of system 100. The pitch of grooves or guides formed by surfaces 202 and 204 may be suitably selected to match the pitch of optical fibers within a standard optical cable (e.g., about 250 μm). Other pitch dimensions and groove sizes are also within the scope of the present invention.

Figure 4:
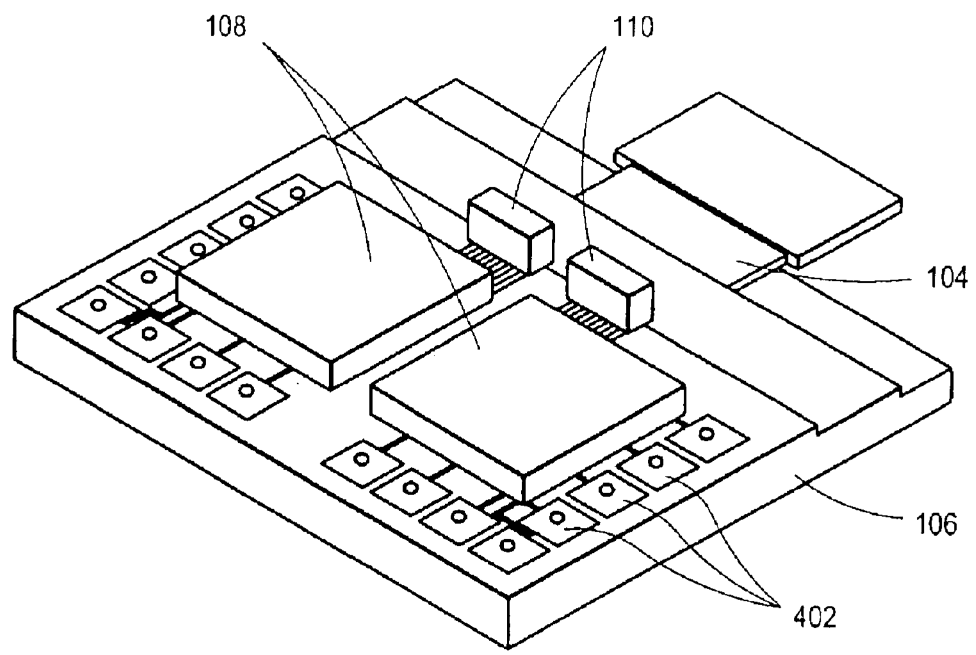
FIG. 4 is an illustration of a transceiver in accordance with the present invention.

In accordance with a further aspect of this embodiment, substrate 106 also includes electrical contacts 402, illustrated in FIG. 4, to facilitate electrical coupling of system 100 to other components. Contacts 402 may be in the form of landing or bonding pads configured to receive conductive bumps and/or wire bonds. In accordance with one embodiment of the invention, contacts 402 are landing pads for flip-chip interconnections, such that substrate 106 can be flip-chip mounted to another substrate such as a printed circuit board In this case, the contacts may be formed of, for example, gold, silver, aluminum, copper, nickel, platinum, tungsten, lead, tin, or any combination of these metals.

Figure 5:
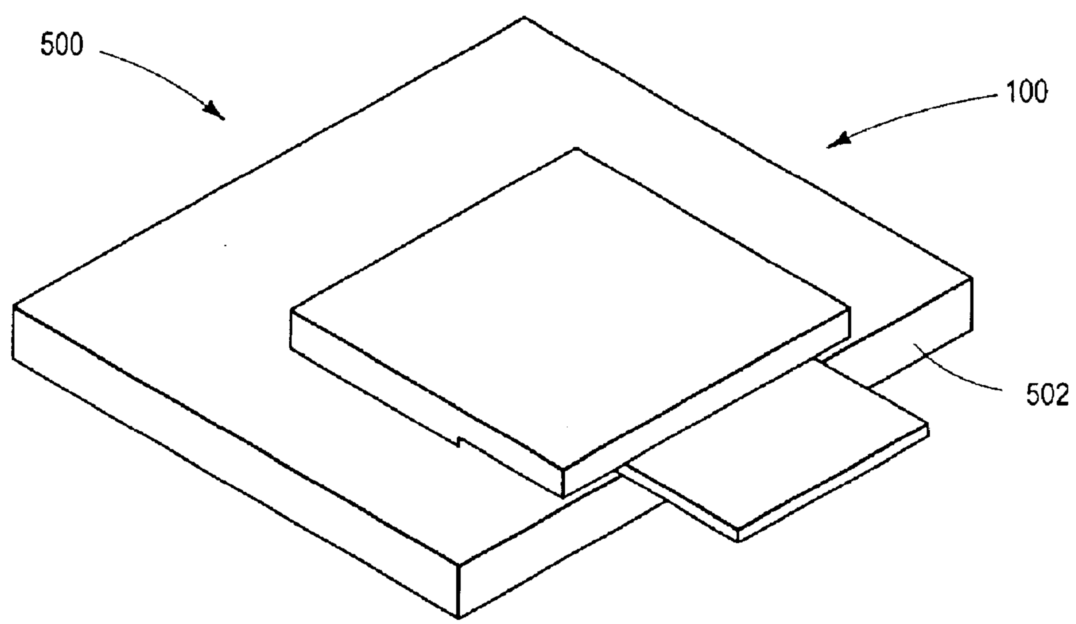
FIG. 5 is an illustration of the transceiver of FIG. 4 mounted to a substrate.

FIG. 5 illustrates an assembly 500, including a system 100 coupled (e.g., using flip-chip techniques) to a substrate 502. Substrate 502 may be formed of, for example, a fire-resistant printed circuit board material such as FR4 or GIL. Although not illustrated, assembly 500 may also include a heat sink or other form of lid interposed between system 100 and substrate 502.

In accordance with other embodiments of the invention, system 100 may include an additional, curved waveguide to facilitate focusing and reflecting of transmitted light. Such curved reflective waveguides are discussed in greater detail in application Ser. No. 10/055,679, the contents of which are hereby incorporated herein by reference.

Optoelectronic device 110 may comprise either a light emitting device such as a light emitting diode, a vertical cavity surface emitting laser, or the like, or a light detecting device such as a pn junction diode, a metal-semiconductor-metal detector, a resonant cavity enhanced detector, or the like. Device 106 may be a discrete component or may be part of an array of optoelectronic devices, which may include any combination of emitters and detectors.

Similarly, electronic device 108 may include any electrical component that is desirably coupled to optoelectronic device 110. For example, when one or more optoelectronic devices 110 include an light emitting device, electronic device 108 includes a driver circuit, and when one or more optoelectronic devices 110 includes a light detecting or receiving device, electronic device 108 includes a suitable amplifier such as a combination of a transimpedance amplifier (TIA) and a limiting amplifier.

Lens 112 may be formed from a variety of materials and in a variety of configuration in accordance with various embodiments of the invention. For example, lens 112 may be formed of quartz, plastic, or similar material, which may be formed as a rod lens (an optical or MM fiber can be used to form the rod lens), a ball lens, a convex lens, or the like. Lens 112 may be a discrete component or form part of an array (e.g., 1×4 or 1×12). Use of rod or ball lenses may be particularly desirable because alignment tolerances can be relaxed when such lenses are employed and high coupling efficiencies can be obtained by using such lenses.

Figure 6:
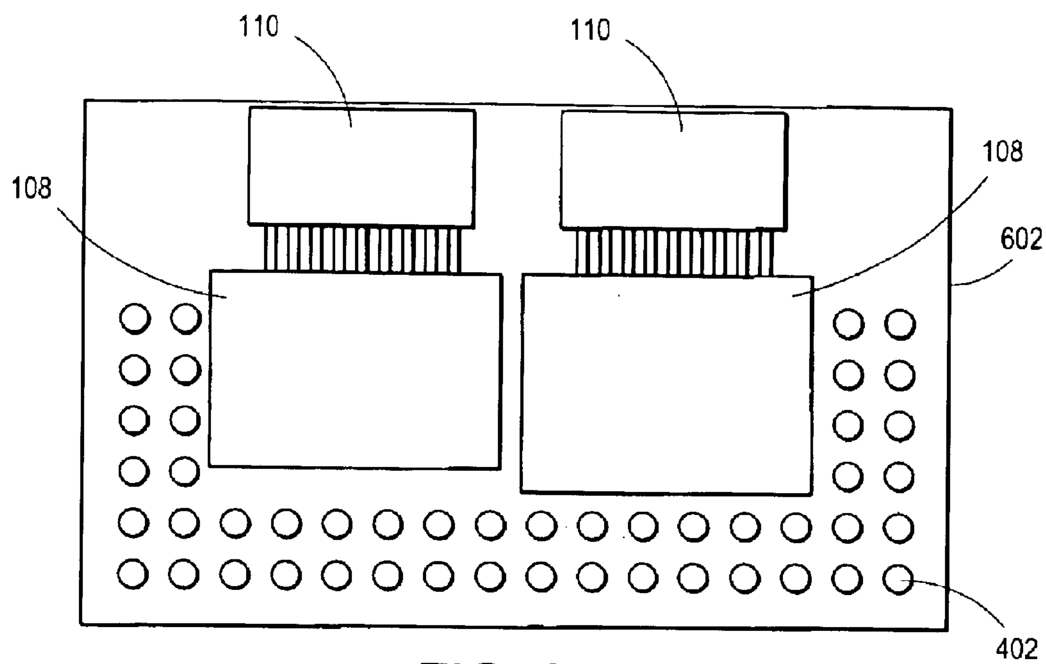
FIG. 6 is an illustration of a portion of an optical interconnect system in accordance with another embodiment of the present invention.
Figure 7:
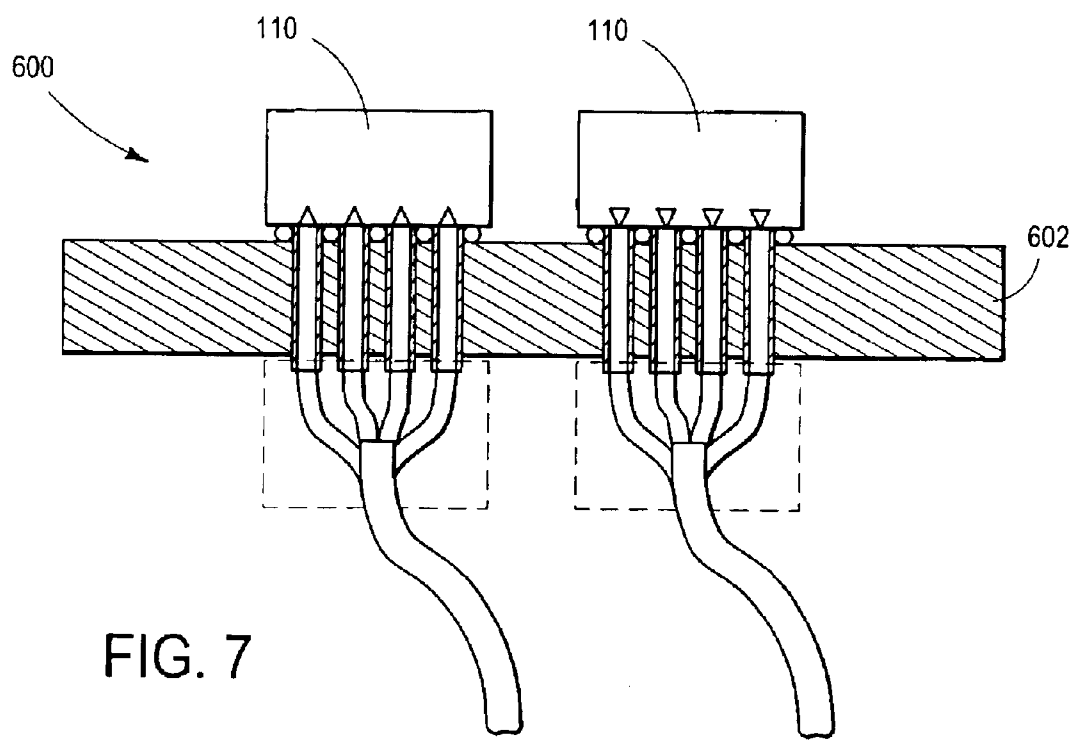
FIG. 7 is a cross-section illustration of a portion of the system illustrated in FIG. 6.

FIGS. 6 and 7 illustrate a system 600 in accordance with another embodiment of the invention. System 600 is similar to system 100, except that system 600 receives fibers 104 from a bottom surface of a substrate 602. Because light is transmitted through substrate 602, system 600 may be configured such that devices 110 emit or receive light in the direction of substrate 106, without requiring bending of light using a portion of the substrate.

Figure 8:
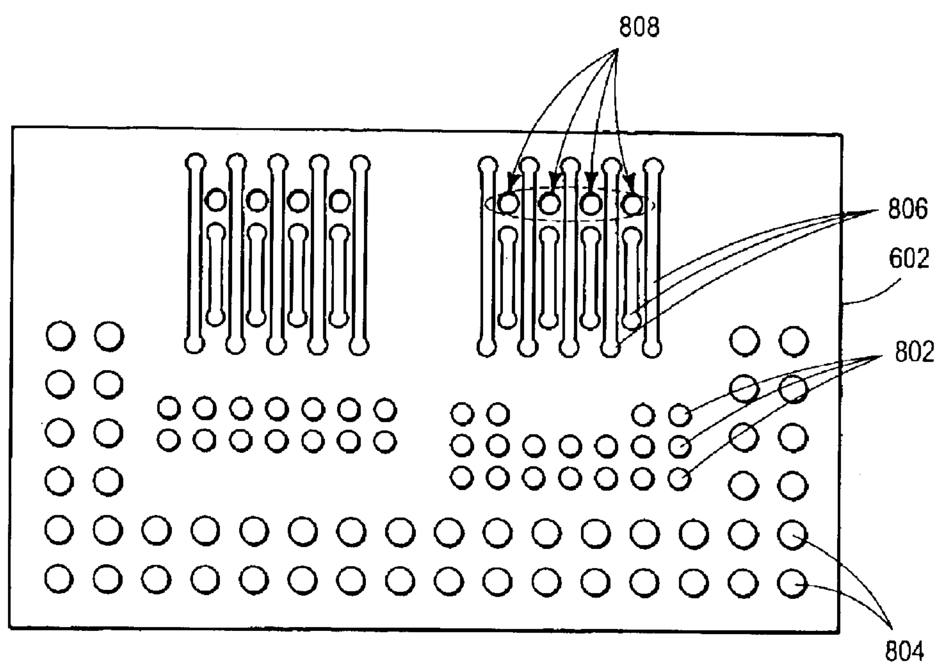
FIG. 8 is a top-view illustration of a portion of a substrate, including conductive traces and through-holes in accordance with the present invention.

FIG. 8 illustrates a substrate 602, which includes electrical contacts 802 configured to bond to devices 110, electrical contacts 804 configured to bond to a lid or other substrate, transmission lines 806 for transmitting information between device 110 and other devices such as devices 108, and through holes or apertures 808 configured to receive fibers 108 and/or to form a waveguide for light transmitted between device 110 and fiber 104. Substrate 602 may be formed of any of the materials described above in connection with substrate 106. In accordance with one embodiment of the invention, substrate 502 is formed of a semiconductor material such as silicon or silicon germanium and apertures 808 are formed by machining or etching substrate 602 material to form apertures 808 having a diameter of about 120 μm at a pitch of about 250 μm.

In accordance with various embodiments of the invention, system 600 may be configured such that fibers 104 are butt-coupled to deices 110, as illustrated in FIG. 7. Alternatively, apertures 808 may include waveguide material to facilitate light transmission between device 110 and fiber 104.

Figure 9:
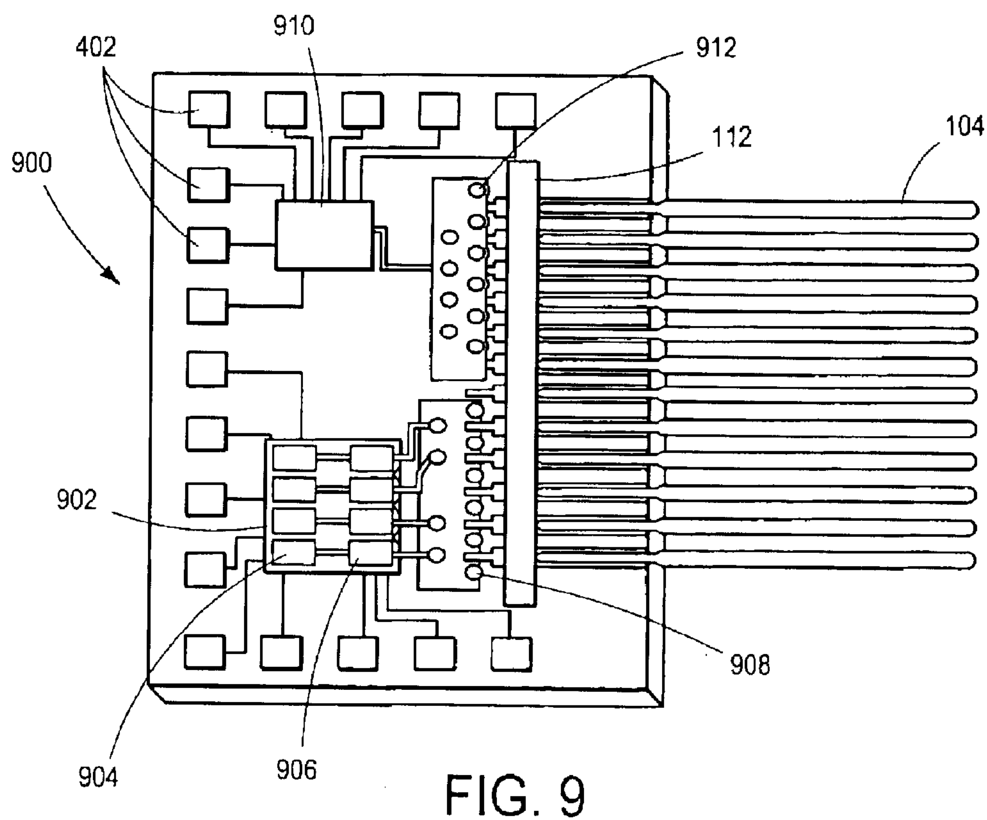
FIG. 9 is a top-perspective illustration of a transceiver in accordance with the present invention.
Figure 10:
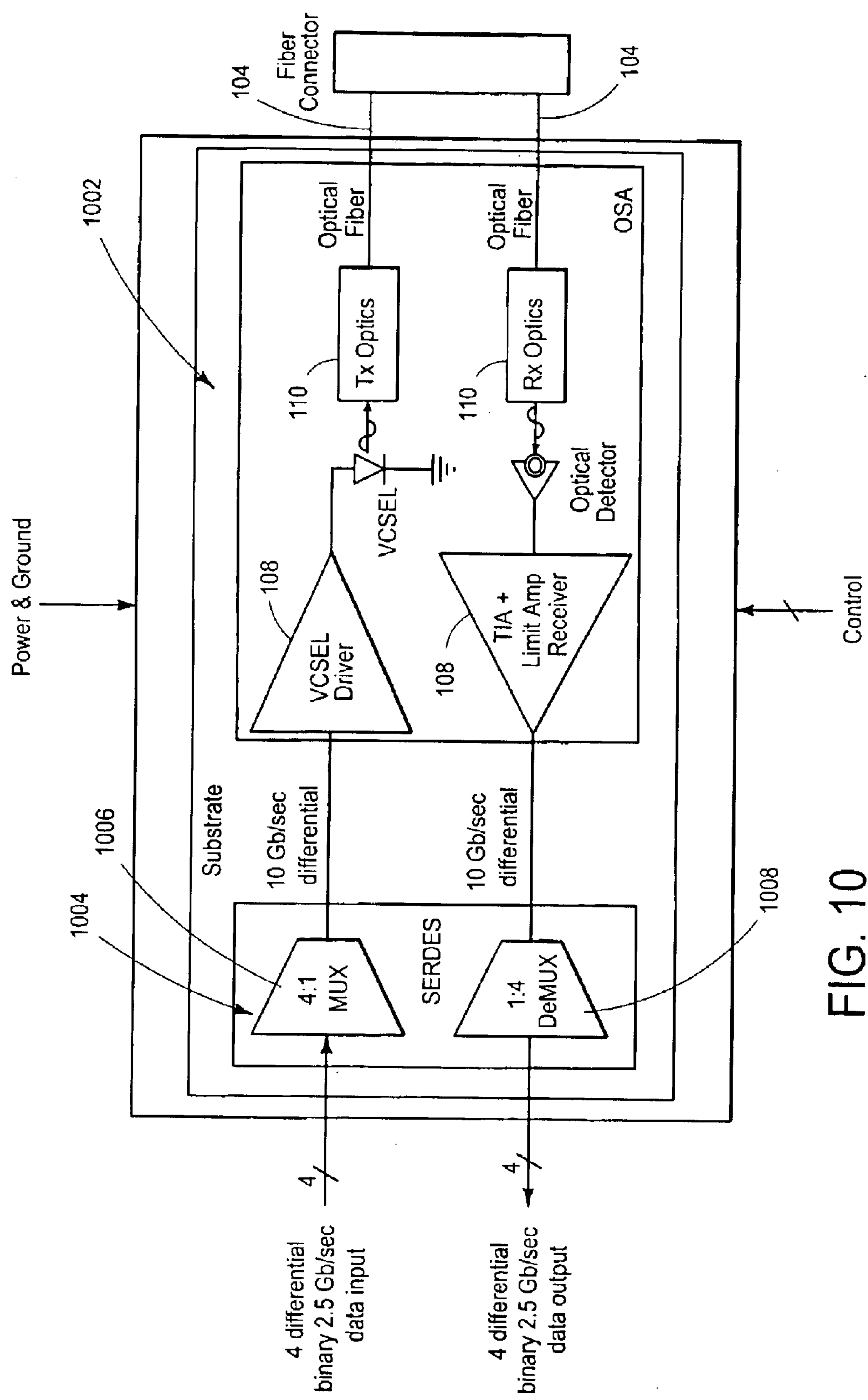
FIG. 10 is a top-view illustration of a transceiver in accordance with another embodiment of the present invention.
Figure 11:
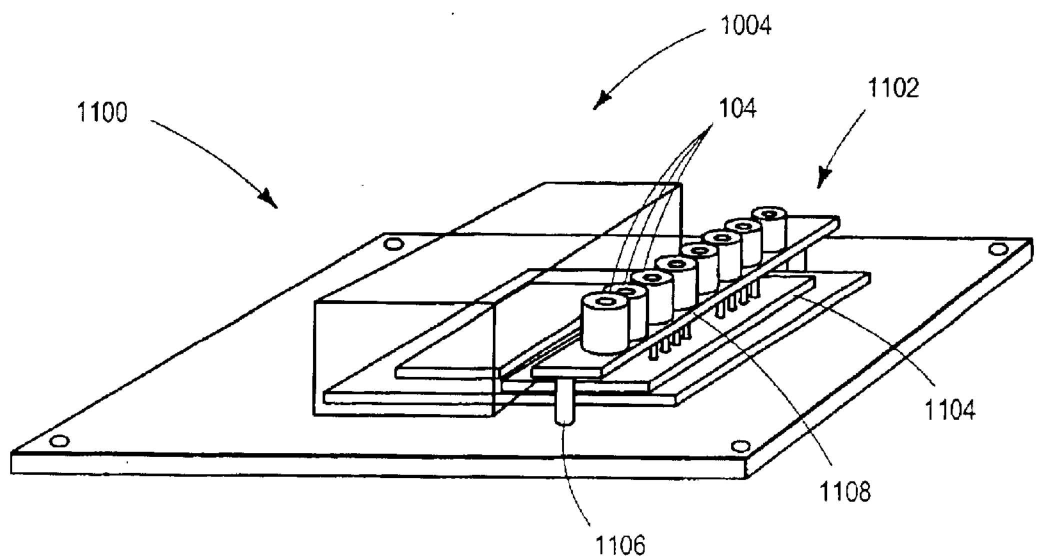
FIG. 11 is a side-perspective illustration of a transceiver in accordance with yet another embodiment of the present invention.

FIGS. 9–11 illustrate various transceiver modules in accordance with the present invention Transceiver 900 includes an amplifier circuit 902, which includes one or more limit amplifiers 904 and one or more TIAs 906, a light detecting device 908, a driver circuit 910, a light emitting device 912, a lens array 112, fibers 104, and electrical contacts 402. Transceiver 900 may comprise system 100, where devices 108 include an amplifier and a driver, and devices 110 include both a light emitting device and a light-detecting device.

FIG. 10 illustrates a transceiver assembly 1000, including a system 1002 and a serializer/deserializer circuit 1004. System 1002 may comprise either system 100 or system 600, described above in connection with FIGS. 1 and 6, respectively.

Circuit 1004 may comprise any suitable multiplexing and demultiplexing devices. In accordance with one embodiment of the invention, circuit 1004 includes a 4:1 multiplexing portion 1006 and a 1:4 demultiplexing portion 1008. In accordance with one aspect of the illustrated embodiment, each portion 1006 and 1006 is configured with four differential pins which transmit data at about 2.5 gigabits per second, such that portions 1006 and 1008 each transmit data at a rate of about 10 gigabits per second.

FIG. 11 illustrates another transceiver assembly 1100, including a system 1102 and a serializer/deserializer circuit 1004 in accordance with the present invention. Assembly 1100 is similar to assembly 1000, except that system 1102 is configured to receive fibers from a top portion of the assembly. In accordance with this embodiment of the invention, system 1102 is formed by wire bonding or otherwise attaching optoelectronic devices such as devices 110 to a substrate 1104, such that light is emitted from devices 110 in an upward direction In this case, posts 1106 and a platform 1108 may be configured to receive fibers 104.

Figure 12:
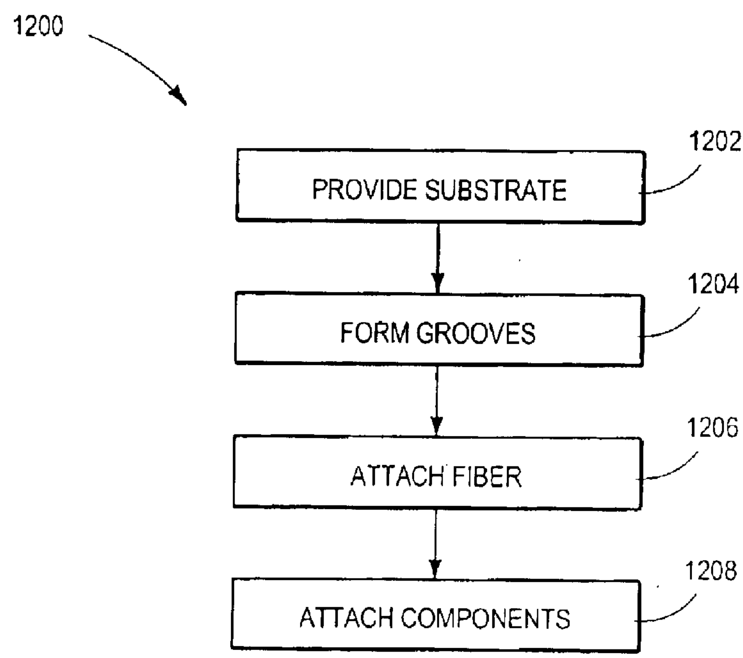
FIG. 12 illustrates a method of forming an optical interconnect system in accordance with the present invention.

FIG. 12 illustrates a method 1200 of forming a system and assembly in accordance with the present invention. Method 1200 includes the steps of providing a substrate (step 1202), forming guides or grooves on the substrate (step 1204), attaching fibers (step 1206), and attaching components to the substrate (step 1208).

Step 1202 includes the process of providing a substrate suitable for receiving and coupling to fibers 104. In accordance with various embodiments of the invention, the substrate includes a semiconductor material and may include integrated circuits, conductive traces, including transmission lines, and other electrical components formed thereon. For example, although illustrated as discrete components in FIG. 1 and FIG. 10, optoelectronic devices 110, devices 108, and serializer/deserializer circuit 1004 may be formed using the substrate (e.g., substrate 106). Alternatively, any combination of devices and circuits 108, 110, and 1004 may be attached to the substrate or another substrate during step 1208 as described below.

During step 1204, grooves are formed in the substrate to receive fibers 104. In accordance with the system illustrate in FIG. 1, the grooves are formed using a suitable selective etch such that v-grooves or similar grooves are formed within the substrate. Alternatively, through-holes or apertures may be formed through the substrate using suitable mechanical means (e.g., drilling or laser techniques), chemical means (e.g., wet or dry etching), or a combination thereof to form apertures such as apertures 808.

Next, fiber 104 is attached to the substrate during step 1206. In accordance with one embodiment of the invention, epoxy is used to secure the fiber in place. Other suitable adhesives or the like may also be used in accordance with the present invention.

During step 1208, any components required to form a system or assembly in accordance with the present invention, which are not integrally formed on a substrate are attached to or electrically coupled to the system formed on the substrate. For example, with reference to FIG. 10, system 1002 and serializer/deserializer may suitably be formed on separate substrates and electrically coupled together by mounting both the system chip and the serializer/deserializer chip onto a third substrate such as a printed circuit board. Alternatively, both the serializer/deserializer circuit and system 1002 may be formed on or attached to the same substrate.

While the present invention is set forth herein in the context of the appended drawing figures, it should be appreciated that the invention is not limited to the specific form shown. For example, although the invention is conveniently described in connection with a substrate comprising a semiconductor material, the invention is not so limited. Various other modifications, variations, and enhancements in the design and arrangement of the method and apparatus set forth herein, may be made without departing from the spirit and scope of the present invention.

We claim:

1. An optical interconnect system comprising:

an optoelectronic device formed on a silicon substrate;

a groove formed in a top surface of said silicon substrate;

an optical fiber adhesively attached in said groove; and a faceted reflective surface including a blazed grating formed into the top surface of the silicon substrate at an angle of approximately 54 degrees from the top surface of the substrate in optical alignment with the optical fiber.

2. An optical interconnect system as in claim 1, wherein the blazed grating has a pitch of approximately one micron.

3. A multi-channel optical interconnect system comprising:

a plurality of optoelectronic devices formed on a first silicon substrate;

a plurality of grooves formed proximate to each other and in parallel alignment in a top surface of said first silicon substrate;

a plurality of optical fibers adhesively attached in said plurality of grooves in optical alignment with said plurality of optoelectronic devices; and a rod lens positioned transverse to said plurality of grooves and interposed in the optical path between said plurality of optoelectronic devices and said plurality of optical fibers.

4. A multi-channel optical interconnect system as in claim 3 further comprising:

a second silicon substrate attached to the top surface of said first silicon substrate;

a microelectronic device attached to said second silicon substrate; and an electrical connection between said microelectronic device and at least one of said plurality of optoelectronic devices.

5. A multi-channel optical interconnect system as in claim 4 wherein said optoelectronic devices are VCSEL's and said microelectronic device includes VCSEL drivers.

6. A multi-channel optical interconnect system as in claim 4 further comprising:

a third silicon substrate attached to the top surface of said first silicon substrate;

a microelectronic device attached to said third silicon substrate; and an electrical connection between said microelectronic device and at least one of said plurality of optoelectronic devices.

7. A multi-channel optical interconnect system as in claim 6 wherein said optoelectronic devices are optical sensors and said microelectronic device is a sensor amplifier.

* * * * *